(12) United States Patent
Scheid et al.

(10) Patent No.: US 9,121,769 B2
(45) Date of Patent: Sep. 1, 2015

(54) SENSOR AND ANTENNA ARRANGEMENT

(75) Inventors: Paul Raymond Scheid, West Hartford, CT (US); Kevin A. Harnist, Huntley, IL (US); James Pristas, Barrington, IL (US)

(73) Assignee: United Technologies Corporation, Hartford, CT (US)

( * ) Notice: Subject to any disclaimer, the term of this patent is extended or adjusted under 35 U.S.C. 154(b) by 1940 days.

(21) Appl. No.: 12/194,683

(22) Filed: Aug. 20, 2008

(65) Prior Publication Data

US 2010/0049377 A1 Feb. 25, 2010

(51) Int. Cl.
| | |
|---|---|
| *G01K 1/02* | (2006.01) |
| *F01D 17/02* | (2006.01) |
| *F01D 21/00* | (2006.01) |
| *G01D 21/00* | (2006.01) |
| *H01Q 1/22* | (2006.01) |
| *H01Q 1/28* | (2006.01) |
| *H02N 2/18* | (2006.01) |

(52) U.S. Cl.
CPC .............. *G01K 1/024* (2013.01); *F01D 17/02* (2013.01); *F01D 21/003* (2013.01); *G01D 21/00* (2013.01); *H01Q 1/2225* (2013.01); *H01Q 1/28* (2013.01); *G01K 2215/00* (2013.01); *H02N 2/186* (2013.01)

(58) Field of Classification Search
USPC ......... 701/1, 3, 14, 29, 33, 100, 4, 7, 8, 9, 10, 701/99, 123, 29.1, 29.4, 29.5, 29.7, 31.4, 701/31.5, 32.7, 32.8, 34.2, 34.4; 477/30; 455/41.2; 340/870.01, 870.07, 870.11, 340/870.28, 870.3, 870.31, 870.32, 870.37, 340/870.38, 945, 963, 971; 73/1.01, 1.02, 73/1.06, 1.14, 1.15, 1.16, 1.37, 1.82; 702/1, 33, 34, 45, 47, 48, 50, 54, 57, 702/85
See application file for complete search history.

(56) References Cited

U.S. PATENT DOCUMENTS

| | | | |
|---|---|---|---|
| 4,428,078 | A | 1/1984 | Kuo |
| 5,408,412 | A | 4/1995 | Hogg et al. |
| 5,448,248 | A | 9/1995 | Anttila |
| 6,470,258 | B1 | 10/2002 | Leamy et al. |
| 6,642,720 | B2 | 11/2003 | Maylotte et al. |
| 7,231,180 | B2 | 6/2007 | Benson et al. |
| 2004/0080429 | A1* | 4/2004 | Wolfe .................. 340/870.07 |
| 2005/0198967 | A1 | 9/2005 | Subramanian |
| 2007/0176840 | A1 | 8/2007 | Pristas et al. |
| 2007/0253361 | A1 | 11/2007 | Pristas et al. |
| 2008/0092520 | A1 | 4/2008 | Brown |
| 2008/0125950 | A1 | 5/2008 | Brown |

* cited by examiner

*Primary Examiner* — Thomas Tarcza
*Assistant Examiner* — Edward Pipala
(74) *Attorney, Agent, or Firm* — Carlson, Gaskey & Olds, P.C.

(57) ABSTRACT

An exemplary sensor for an aircraft includes a sensor mountable within an aircraft and operative to communicate wirelessly communications to a distributed aperture antenna. The sensor is operative to harvest energy from the aircraft to power the sensor.

24 Claims, 4 Drawing Sheets

SENSOR AND ANTENNA ARRANGEMENT

FIELD OF INVENTION

This invention relates generally to an arrangement of energy harvesting sensors that wirelessly communicate with a distributed aperture antenna.

BACKGROUND

As known, sensors are often used to collect information. Some sensors sense temperature or vibration of an aircraft, for example. Users monitor aircraft conditions using the sensed information. Collecting information from multiple sensors desirably provides more information about the aircraft than collecting information from a single sensor. However, increasing the number of sensors within an aircraft undesirably adds cost and weight to the aircraft.

Sensors are powered to communicate sensed information away from the sensor. Powering and communicating with multiple sensors often requires expensive and heavy wiring. Other sensors are wireless and include a replaceable source of power, such as a battery. Replacing the battery is often difficult due to the sensor's position within the aircraft. The battery also increases the size and weight of the sensor. Some sensors harvest energy from the aircraft instead of using a wired connection or battery.

Antennas are used in wireless communication systems that include wireless sensors. Wireless communications with one of the wireless sensors can disadvantageously interfere with wireless communications with another one of the wireless sensors. Powering the antennas is costly, and the antennas add weight to the aircraft.

SUMMARY

An exemplary sensor for an aircraft includes a sensor mountable within an aircraft and operative to communicate wirelessly communications to a distributed aperture antenna. The sensor is operative to harvest energy from the aircraft to power the sensor.

An exemplary sensor arrangement for an aircraft includes at least one energy harvesting sensor at least partially powered by energy harvested from the aircraft. A distributed aperture antenna is operative to receive wirelessly communications from the at least one energy harvesting sensor.

An exemplary method of wireless communication in an aircraft includes harvesting energy from an aircraft, sensing a condition of the aircraft, and communicating the condition using energy from the harvesting step. The method may include a controller communicating with the sensor to configure the sensor, manage the sensor, or both.

These and other features of the example disclosure can be best understood from the following specification and drawings, the following of which is a brief description:

DETAILED DESCRIPTION

Figure 1:
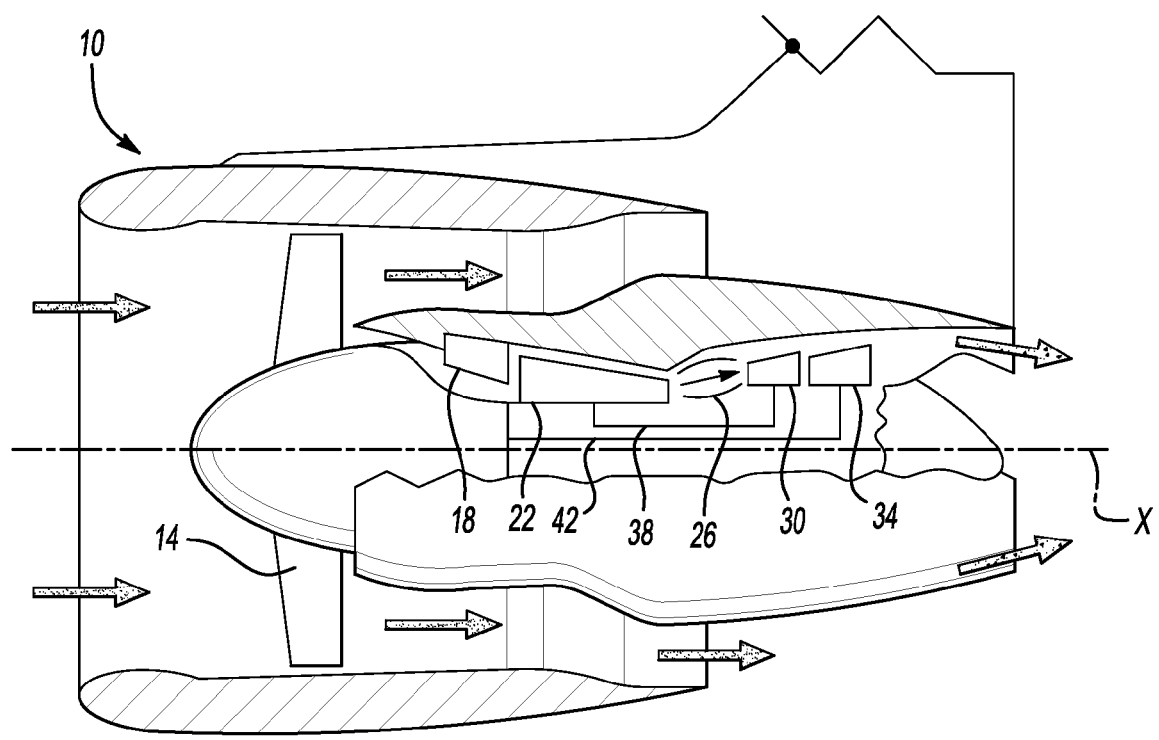
FIG. 1 schematically shows an example gas turbine engine.

FIG. 1 schematically illustrates an example gas turbine engine 10 including (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine centerline X. During operation, the fan section 14 intakes air, which is then pressurized by the compressors 18, 22. The combustor 26 burns fuel mixed with the pressurized air. The high and low pressure turbines 30, 34 extract energy from the combustion gases flowing from the combustor 26.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power the low pressure compressor 18 and the fan section 14 through a low speed shaft 42. The disclosed examples are not applicable only to components within the two-spool gas turbine architecture described above and may be used with other architectures such as a single spool axial design, a three spool axial design, and other architectures. That is, there are various types of gas turbine engine components and components within other systems, many of which could benefit from the examples disclosed herein.

Figure 2:
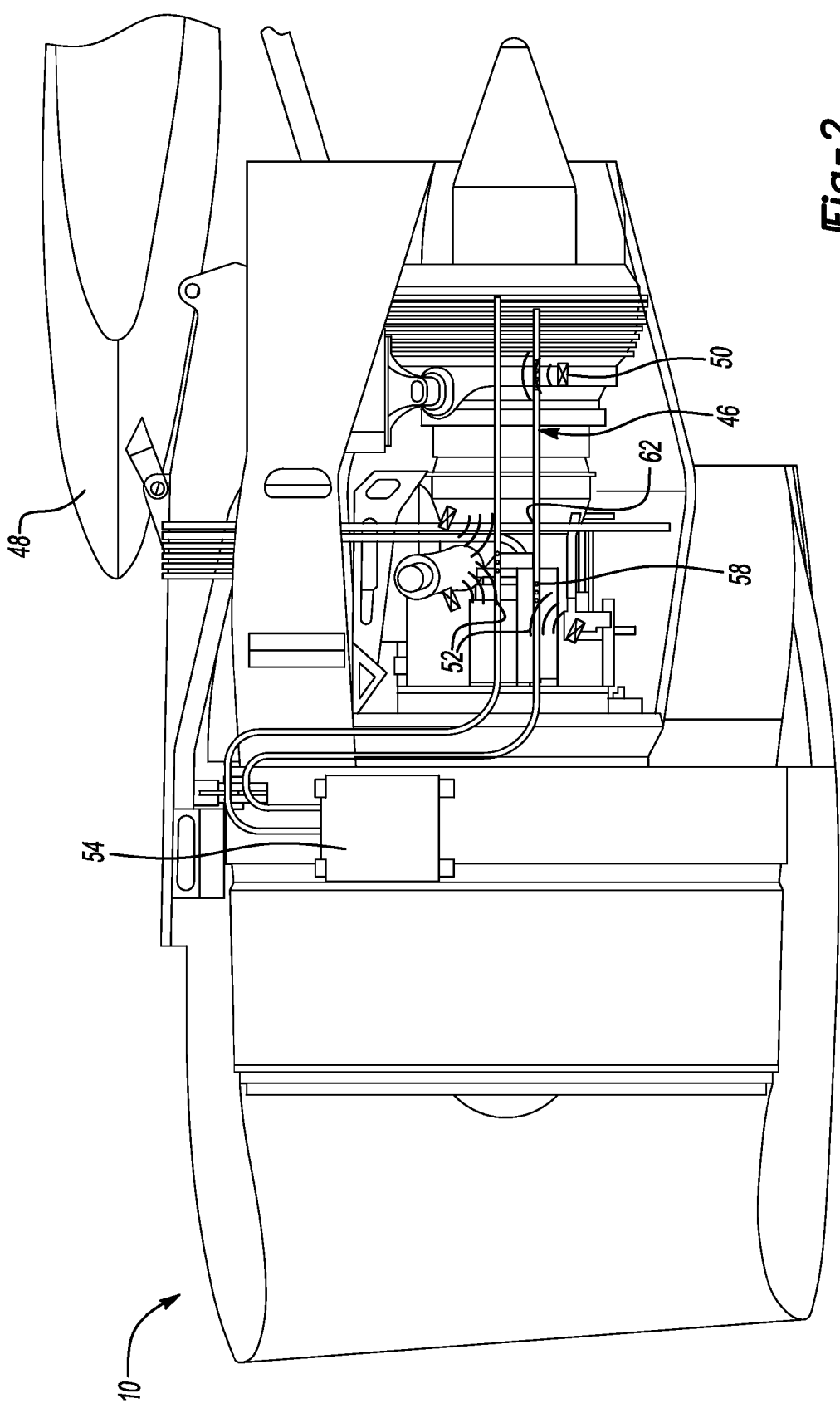
FIG. 2 shows a partial sectional view of another example gas turbine engine having a sensor and antenna arrangement.
Figure 3:
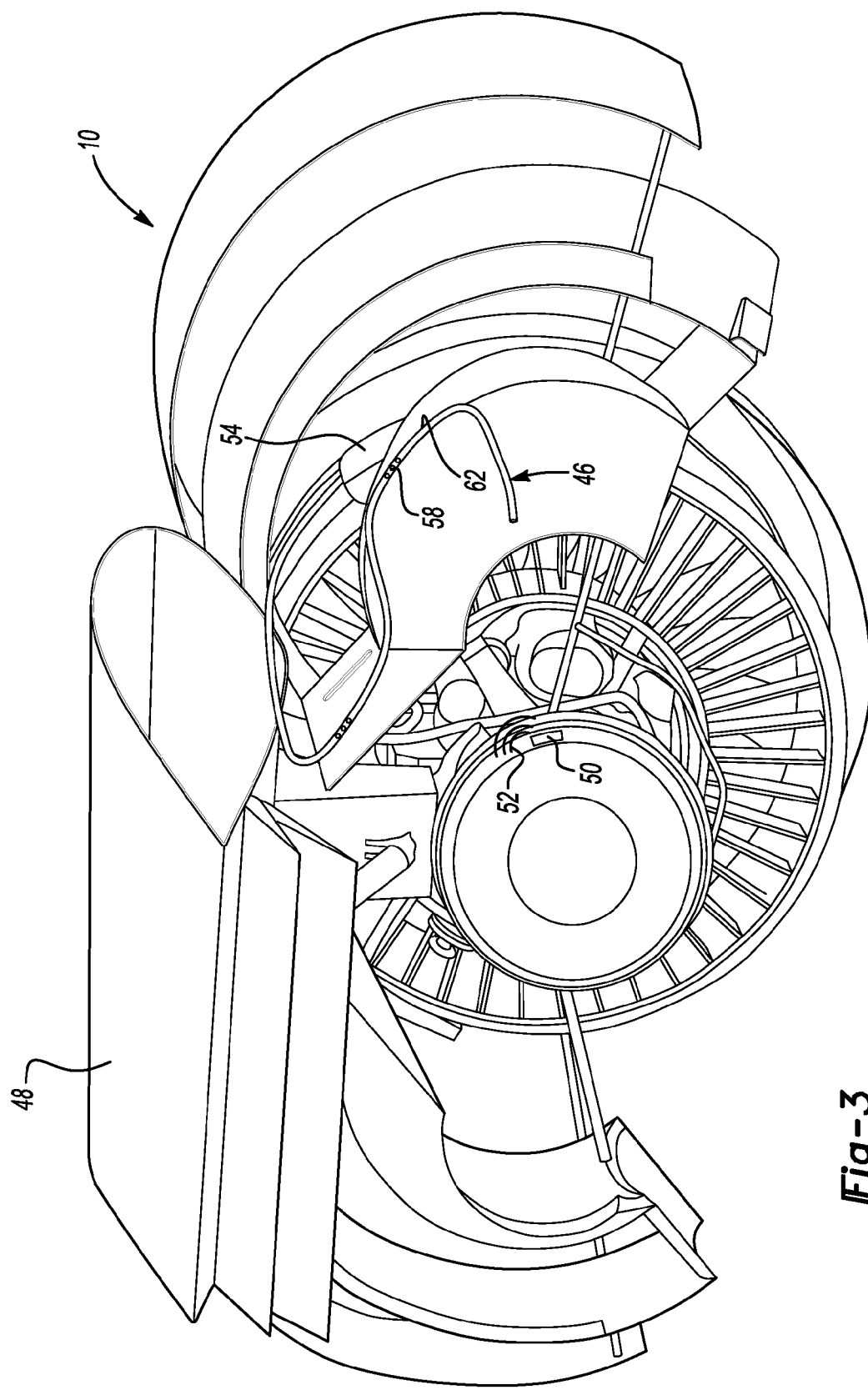
FIG. 3 shows a perspective view of the FIG. 2 gas turbine engine.

As shown in FIGS. 2 and 3, the example gas turbine engine 10 for an aircraft 48 includes a Full Authority Digital Electric Control (FADEC) 54, a type of controller, configured to receive wireless communications via a distributed aperture antenna 46 from at least one energy harvesting sensor 50 that senses information from the engine 10. In this example, the distributed aperture antenna 46 collects wireless signals 52 from the energy harvesting sensor 50 and transfers the signals to the FADEC 54 mounted to the engine 10 or another type of avionics box mounted to another area of the aircraft 48. The FADEC 54 stores the sensed information from the energy harvesting sensor 50 or, in another example, communicates the sensed information to another portion of the aircraft 48.

Energy harvested from the engine 10 powers the energy harvesting sensor 50. As known, the engine 10 produces many sources of energy suitable for harvest. In one example, the energy harvesting sensor 50 includes thermoelectrics that convert thermal potential difference into electric potential difference. Other examples include incorporating a piezoelectric portion into the energy harvesting sensor 50 to harvest vibratory energy from the engine 10. Still other examples of the energy harvesting sensor 50 are powered by static electricity generated by airflow through the engine 10, pressure differences within the engine 10, acoustic energy generated by the engine 10, etc.

In this example, the energy harvesting sensor 50 can be configured to sense or monitor various conditions of the engine 10. Example conditions include engine temperatures, engine pressures, engine speeds, engine vibrations, acoustic fluctuations in the engine, the presence of oil debris within the engine, engine strains, and engine accelerations. The energy harvesting sensor 50 is also removeably mountable with the engine 10. That is, an operator can reposition the energy harvesting sensor 50 to facilitate monitoring a particular condition of the engine 10.

The example distributed aperture antenna 46 includes at least one aperture 58 within a shield 62 of the distributed aperture antenna 46. As known, the aperture 58 provides an energy leakage path for the wireless signals 52. The energy leakage path facilitates wireless communications between the FADEC 54 and the energy harvesting sensor 50.

In this example, the distributed aperture antenna 46 is routed through the engine 10 such that the aperture 58 is positioned near the energy harvesting sensor 50. The aperture 58 within the distributed aperture antenna 46 provides a more direct path for communicating with the energy harvesting sensor 50 than provided by other areas of the distributed aperture antenna 46. Because the path is more direct and line-of-sight, the link performs more efficiently than non-line-of-sight communications. The improved efficiency allows effective communications using lower strength signals between the FADEC 54 connected to the distributed aperture antenna 46 and the energy harvesting sensor 50. As known, using lower strength signals reduces the overall power requirement for wireless communications.

Figure 4:
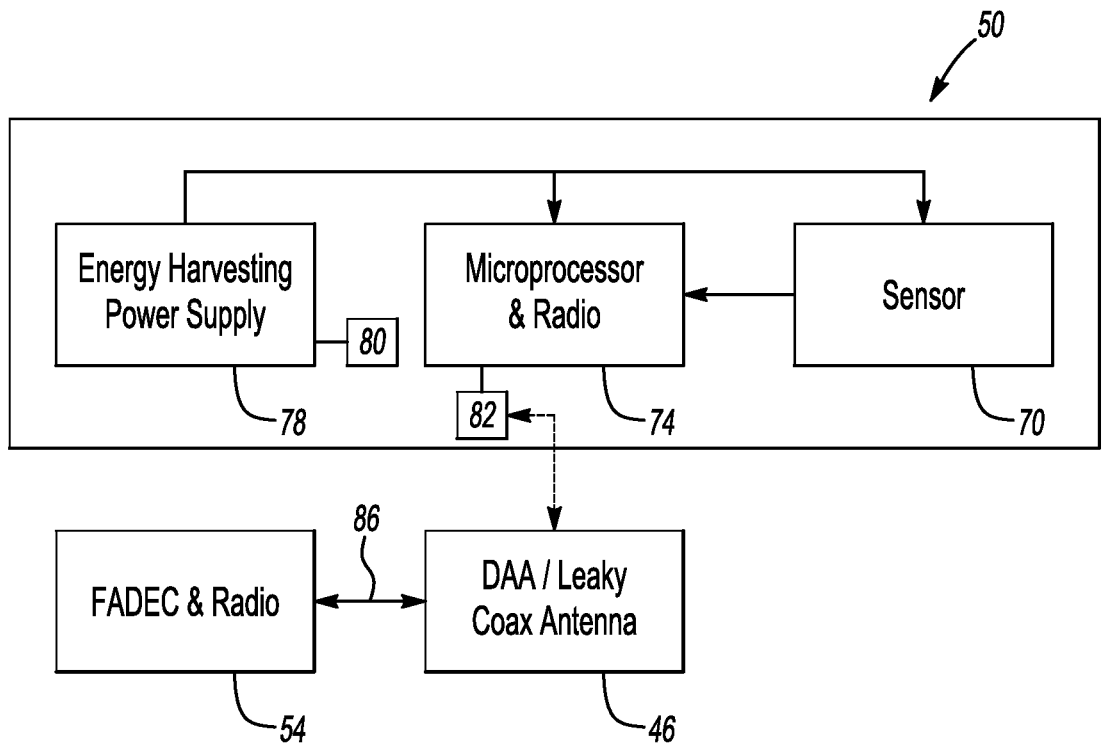
FIG. 4 schematically shows an example sensor and antenna arrangement.

Referring now to FIG. 4, the example energy harvesting sensor 50 includes a sensor portion 70, a microprocessor and radio 74, an antenna 82, and an energy harvesting power supply 78. The energy harvesting sensor 50 senses a condition of the engine 10, and the microprocessor and radio 74 transmit, via the antenna 82, the sensed information to the FADEC 54 via the distributed aperture antenna 46. The energy harvesting power supply 78 powers the sensor 50 and the microprocessor and radio 74.

In some examples, the energy harvesting power supply 78 includes an energy storage device 80, such as a capacitor or a battery that provides power to the sensor 70 during brief time periods requiring high current or during periods low energy harvesting. The energy harvesting power supply 78 can act as a sensor such as a piezoelectric harvesting device for vibration monitoring.

The FADEC 54, or other avionics box, is connected to the distributed aperture antenna 46 by coaxial connection 86. Other examples utilize different RF transmission line technologies. In this example, the communications at 86 between the FADEC 54 and the distributed aperture antenna 46 are wired communications.

Figure 5:
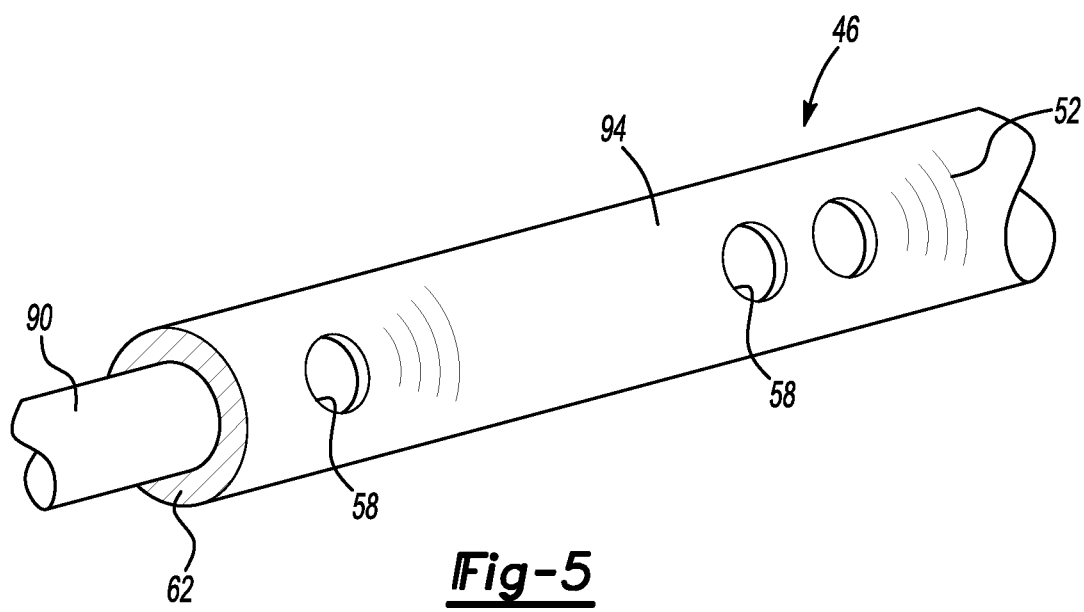
FIG. 5 shows a perspective view of an example distributed aperture antenna.

Referring now to FIG. 5 with continuing reference to FIG. 4, the example distributed aperture antenna 46 includes the shield 62 surrounding an antenna core 90. The aperture 58 extends through the shield 62 to the antenna core 90. Other examples of the aperture 58 do not extend through the shield 62, such a thinned area of the shield 62 relative other portions of the shield 62. Both the aperture 58 and the thinned area provide energy leakage paths within the antenna 46 that facilitate communication with the sensor 50. The position of the energy leakage paths within the antenna 46, and the routing of the antenna 46, corresponds to the placement of the sensor 50. Although the example distributed aperture antenna 46 is described as having a general coaxial structure, other example antennas have differing non-coaxial structures.

The wireless signals 52, or electric fields, emanate from areas of the distributed aperture antenna 46 near the aperture 58. Provided the level of power provided to the distributed aperture antenna 46 remains consistent, adding more apertures to the shield 62 decreases the signal strength of the wireless signals 52.

Features of this disclosure include using lower strength signals that provide less interference with other wireless communication than higher strength signals when communicating with the FADEC 54. The wireless link between the FADEC 54 and the energy harvesting sensor 50 is also more efficient than some prior designs. The improved efficiency facilitates utilizing lower signal strengths, provides more flexible options for mounting the energy harvesting sensor 50, etc. Another feature is varied mountablility of the energy harvesting sensor 50 because less concern need be given to the types of structures that surround the energy harvesting sensor 50.

Additional features of this disclosure include communicating information from energy harvesting sensor 50 to the FADEC 54 using less power than previous arrangements. Another feature includes enhanced signal integrity due to reduced interference between signals from an adjacent energy harvesting sensor due to effectively communicating with wireless signals 52. Still other features include increasing the density of the energy harvesting sensor 50 within the engine 10 while maintaining signal integrity between the energy harvesting sensor 50 and the distributed aperture antenna 46 and throughout the aircraft 48. An additional feature of the invention is the ability to reuse certain sections of wireless spectrum, allowing more information to be gathered by the energy harvesting sensors 50.

Although a preferred embodiment has been disclosed, a worker of ordinary skill in this art would recognize that certain modifications would come within the scope of this invention. For that reason, the following claims should be studied to determine the true scope and content of this invention.

We claim:

1. A sensor for an aircraft, comprising
a sensor mountable within an aircraft and configured to communicate line-of-sight wireless communications to a distributed aperture antenna, wherein the sensor is configured to harvest energy from the aircraft to power the sensor.

2. The sensor of claim 1, wherein the distributed aperture antenna is mounted within a gas turbine engine portion of the aircraft.

3. The sensor of claim 1, wherein the sensor is a wireless aircraft sensor.

4. The sensor of claim 1, wherein the sensor harvests at least one of thermal energy or vibratory energy from the aircraft.

5. The sensor of claim 1, wherein the sensor is mounted adjacent an aperture of the distributed aperture antenna.

6. The sensor of claim 1, wherein the sensor is removeably mountable to a gas turbine engine portion of the aircraft.

7. The sensor arrangement of claim 1, including a controller in communication with the antenna that receives the wireless communications from the sensor.

8. A sensor arrangement for an aircraft, comprising:
at least one energy harvesting sensor configured to be at least partially powered by energy harvested from the aircraft; and
a distributed aperture antenna configured to receive wireless communications from the at least one energy harvesting sensor, wherein the wireless communications are line-of-sight wireless communications.

9. The sensor arrangement of claim 8, wherein the distributed aperture antenna comprises a plurality of energy leakage paths.

10. The sensor arrangement of claim 9, wherein the plurality of energy leakage paths comprise apertures extending through the shield to a core portion of a coaxial antenna.

11. The sensor arrangement of claim 9, wherein at least one of the plurality of energy leakage paths is positioned adjacent at least one of the plurality of sensors.

12. The sensor arrangement of claim 9, wherein each of the plurality of energy leakage paths is configured to provides an electric field corresponding to one of the at least one energy harvesting sensor.

13. The sensor arrangement of claim 8, wherein the at least one energy harvesting sensor is configured to be at least partially powered by energy harvested from a gas turbine engine portion of the aircraft.

14. The sensor arrangement of claim 8, including a controller connected to the distributed aperture antenna, the controller operative to receive the wireless communications from the sensor through the distributed aperture antenna.

15. A method of wireless communication in an aircraft, comprising:
   harvesting energy from an aircraft;
   sensing a condition of the aircraft; and
   communicating the condition to a distributed aperture antenna using the energy from the harvesting, wherein the communicating is along a line-of-sight communication path.

16. The method of claim 15, including sensing using the energy from the harvesting.

17. The method of claim 15, including positioning an aperture in the distributed aperture antenna near the sensing.

18. The method of claim 15, wherein the condition includes at least one of the temperature of the aircraft or the vibration of the aircraft.

19. The method of claim 15, including communicating wireless signals from a controller connected to a distributed aperture antenna to the sensor.

20. The method of claim 15, wherein the communications configure the sensor, manage the sensor, or both.

21. The method of claim 15, including harvesting energy from the aircraft using a sensor, wherein the sensor comprises a transmitter to communicate the condition sensed by the sensor to the distributed aperture antenna.

22. The sensor or claim 1, wherein the sensor operative to harvest energy from at least one of thermal potential differences, vibrations, static electricity generated by airflow, pressure differentials, or acoustic energy.

23. The sensor arrangement of claim 8, wherein at least one energy harvesting sensor is at least partially powered by thermal potential differences, vibrations, static electricity generated by airflow, pressure differences, or acoustic energy.

24. The method of claim 15, wherein the harvesting comprising harvesting energy from at least one of thermal potential differences, vibrations, static electricity generated by airflow, pressure differences, or acoustic energy.

* * * * *

UNITED STATES PATENT AND TRADEMARK OFFICE
CERTIFICATE OF CORRECTION

PATENT NO. : 9,121,769 B2
APPLICATION NO. : 12/194683
DATED : September 1, 2015
INVENTOR(S) : Paul Raymond Scheid It is certified that error appears in the above-identified patent and that said Letters Patent is hereby corrected as shown below:

IN THE CLAIMS:

In claim 12, column 4, line 65; delete "provides" and replace with --provide--

In claim 22, column 6, line 10; delete "or" and replace with --of--

Signed and Sealed this
Fifth Day of July, 2016

Michelle K. Lee
*Director of the United States Patent and Trademark Office*